United States Patent
Suzuki

(10) Patent No.: US 9,470,547 B2
(45) Date of Patent: Oct. 18, 2016

(54) INFORMATION PROCESSING DEVICE, MOBILE TERMINAL, AND NON-TRANSITORY RECORDING MEDIUM

(71) Applicant: TOYOTA JIDOSHA KABUSHIKI KAISHA, Toyota-shi, Aichi-ken (JP)

(72) Inventor: Koichi Suzuki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/591,284

(22) Filed: Jan. 7, 2015

(65) Prior Publication Data
US 2015/0198458 A1    Jul. 16, 2015

(30) Foreign Application Priority Data
Jan. 14, 2014    (JP) ................. 2014-004474

(51) Int. Cl.
*G01C 21/00* (2006.01)
*G08G 1/123* (2006.01)
*G01C 21/34* (2006.01)
*G01C 21/36* (2006.01)
*G08G 1/01* (2006.01)
(Continued)

(52) U.S. Cl.
CPC ......... *G01C 21/3694* (2013.01); *G01C 21/367* (2013.01); *G08G 1/0112* (2013.01); *G08G 1/0133* (2013.01); *G08G 1/0141* (2013.01); *G08G 1/096716* (2013.01); *G08G 1/096775* (2013.01); *H04W 4/046* (2013.01)

(58) Field of Classification Search
CPC ............ G01C 21/367; G01C 21/3694; G08G 1/0112; G08G 1/0141; G08G 1/096716; G08G 1/096775; G08G 1/0133; H04W 4/04

USPC ........................................................ 701/439
See application file for complete search history.

(56) References Cited

U.S. PATENT DOCUMENTS

2010/0088019 A1 *    4/2010  Barcklay ............... G01C 21/30
                                                              701/533
2010/0114484 A1      5/2010  Kida et al.
(Continued)

FOREIGN PATENT DOCUMENTS

FR          2896462 A1       7/2007
JP       2003-288680 A      10/2003
(Continued)

*Primary Examiner* — Calvin Cheung
*Assistant Examiner* — Paula L Schneider
(74) *Attorney, Agent, or Firm* — Oliff PLC

(57) ABSTRACT

An information processing device that receives and processes posting information and position information from a mobile terminal includes: a center processing device that processes the information received from the mobile terminal; and a posting database in which the information is stored. The position information includes first position information indicating a first position of the mobile terminal when a user enters an information posting intention into the mobile terminal, and second position information indicating a second position of the mobile terminal when the user enters an information posting instruction thereinto. The center processing device determines position information to be associated with the posting information, based on at least one of a difference between the first and second position and a difference between a first point-in-time at which the mobile terminal is positioned at the first position and a second point-in-time at which the mobile terminal is positioned at the second position.

10 Claims, 14 Drawing Sheets

(51) Int. Cl.
*G08G 1/0967* (2006.01)
*H04W 4/04* (2009.01)

(56) References Cited

U.S. PATENT DOCUMENTS

2011/0291863 A1* 12/2011 Ozaki ................ G01C 21/3682
340/995.14

2014/0280103 A1* 9/2014 Harris ............... G06F 17/30041
707/724

FOREIGN PATENT DOCUMENTS

| | | |
|---|---|---|
| JP | 2005-157410 A | 6/2005 |
| JP | 2011247831 A | 12/2011 |
| JP | 2013-218477 A | 10/2013 |

* cited by examiner

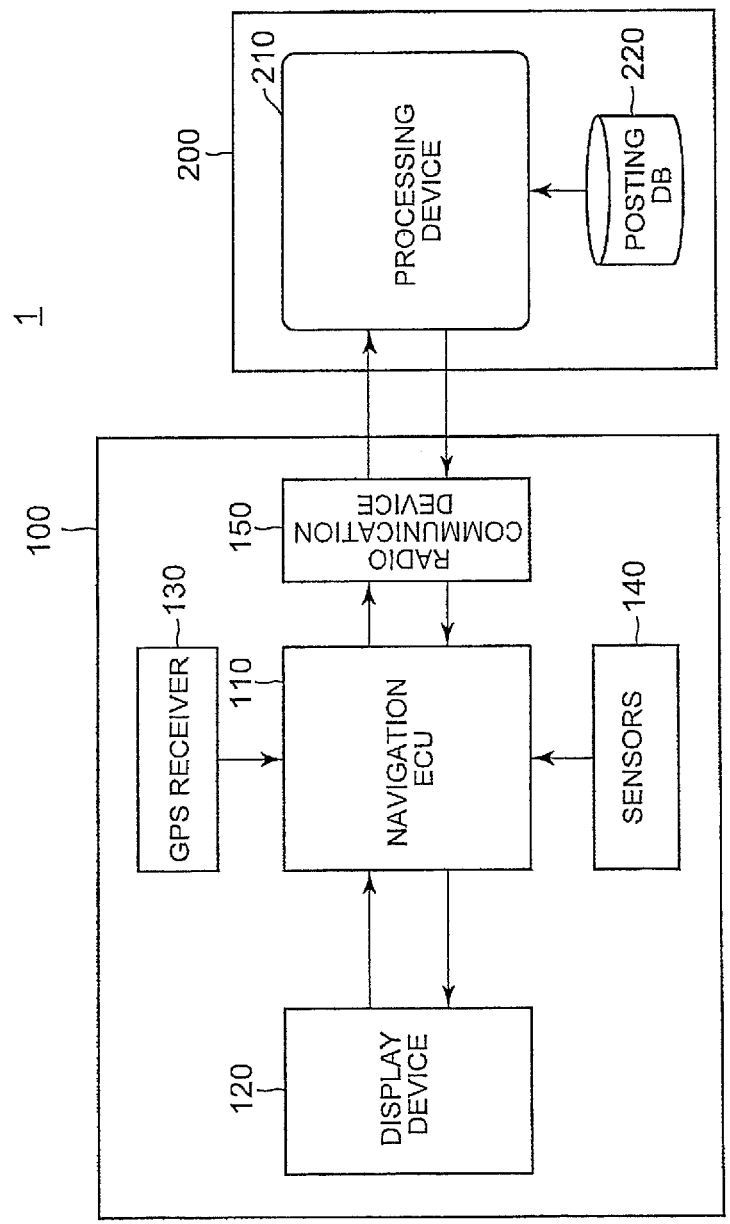

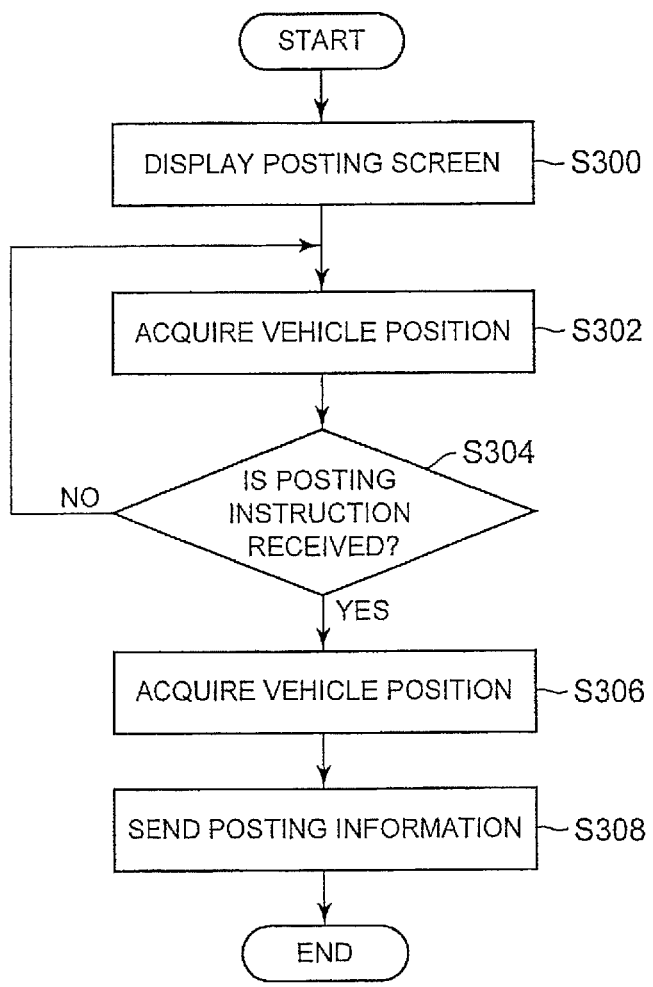

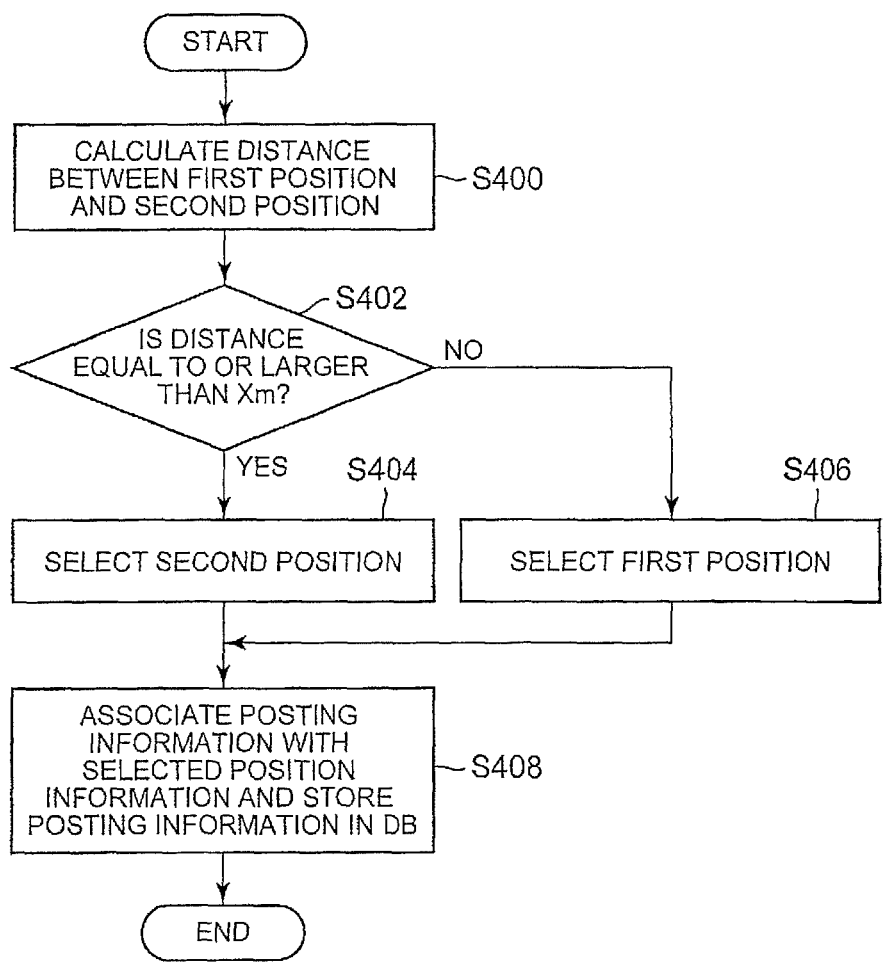

INFORMATION PROCESSING DEVICE, MOBILE TERMINAL, AND NON-TRANSITORY RECORDING MEDIUM

INCORPORATION BY REFERENCE

The disclosure of Japanese Patent Application No. 2014-004474 filed on Jan. 14, 2014 including the specification, drawings and abstract is incorporated herein by reference in its entirety.

BACKGROUND OF THE INVENTION

1. Field of the Invention

The present invention relates to an information processing device, a mobile terminal, and a non-transitory recording medium.

2. Description of Related Art

An in-vehicle display device, which displays user-entered posting information, is known wherein the in-vehicle display device displays map data on which posting information is displayed at a position that is identified based on position information indicating the entry position of the posting information (for example, see Japanese Patent Application Publication No. 2011-247831 (JP 2011-247831 A)).

Incidentally, this type of posting information is useful when the position information on the posting information is accurate.

SUMMARY OF THE INVENTION

The present invention provides an information processing device, a mobile terminal, and a non-transitory recording medium that can increase the accuracy of position information associated with positing information.

A first aspect of the present invention relates to an information processing device that receives and processes posting information, as well as position information, from a mobile terminal. The information processing device includes a center processing device that processes the information received from the mobile terminal; and a posting database in which the information processed by the center processing device is stored. The position information includes first position information, which indicates a first position of the mobile terminal when a user enters an information posting intention into the mobile terminal, and second position information which indicates a second position of the mobile terminal when the user enters an information posting instruction into the mobile terminal. The center processing device determines position information to be associated with the posting information, based on at least one of a difference between the first position and the second position and a difference between a first point-in-time at which the mobile terminal is positioned at the first position and a second point-in-time at which the mobile terminal is positioned at the second position.

According to the first aspect of the present invention, an information processing device and a mobile terminal, which can increase the accuracy of position information associated with positing information, are made available.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a diagram showing an overall configuration of a system 1 in an embodiment of the present invention;

FIG. 3 is a flowchart showing an example of the posting information sending processing performed by a navigation ECU 110 in the embodiment of the present invention;

FIG. 4 is a flowchart showing an example of the posting information storing processing performed by an information processing device 200 in the embodiment of the present invention;

DETAILED DESCRIPTION OF EMBODIMENTS

Figure 2A:
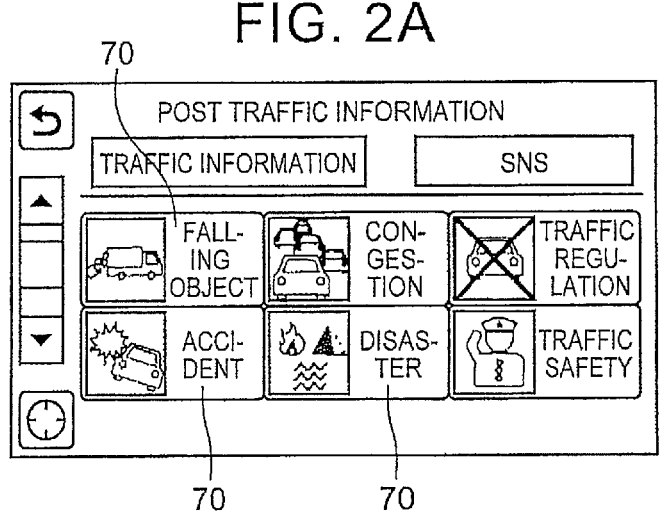
FIGS. 2A to 2C are diagrams showing an example of display on a display device 120 in the embodiment of the present invention.

Embodiments of the present invention are described in detail below with reference to the attached drawings.

FIG. 1 is a diagram showing an overall configuration of a system 1. The system 1 includes an in-vehicle device (an example of a mobile terminal) 100 and an information processing device 200.

The in-vehicle device 100 is mounted on a vehicle. The in-vehicle device 100 includes a navigation Electronic Control Unit (ECU) 110, a display device 120, a Global Positioning System (GPS) receiver 130, various sensors 140, and a radio communication device 150.

The navigation ECU 110, which works as a terminal processing device, implements the navigation function. The navigation ECU 110 also generates posting information. The navigation ECU 110 displays posting information, received from the information processing device 200, on the display device 120. The posting information will be described later. The function of the navigation ECU 110 may be implemented, in part or in whole, by another ECU (or a plurality of ECUs) or by a processing device that may be built in the display device 120. In some cases, these are generically called a terminal processing device.

The display device 120, a touch panel display, forms a user interface. The display device 120 may be another display device such as a Head-Up Display (HUD). The user interface may be implemented by a device other than the display device 120 (for example, by a mechanical button, a joy stick, etc.).

The GPS receiver 130, which works as a position measurement device, calculates the vehicle position based on the reception result of a radio wave from GPS satellites.

The sensors 140 include a vehicle speed sensor, a gyro sensor, and a geomagnetic sensor. In some cases, these sensors are generically called a sensor.

The radio communication device 150 can wirelessly communicate with the information processing device 200. The radio communication may be a communication that is partially carried out via a network such as the Internet. The radio communication device 150 sends posting information, generated by the in-vehicle device 100, to the information processing device 200. In addition, the radio communication device 150 receives posting information from the information processing device 200.

The information processing device 200 is installed outside the vehicle. The information processing device 200 is installed, for example, in a center that provides the Telematics service. The information processing device 200 may be a form of a server. The information processing device 200 includes a processing device 210, such as a computer working as a center processing device, and a posting database (DB) 220. The information processing device 200 can wirelessly communicate with the in-vehicle device 100.

Figure 2B:
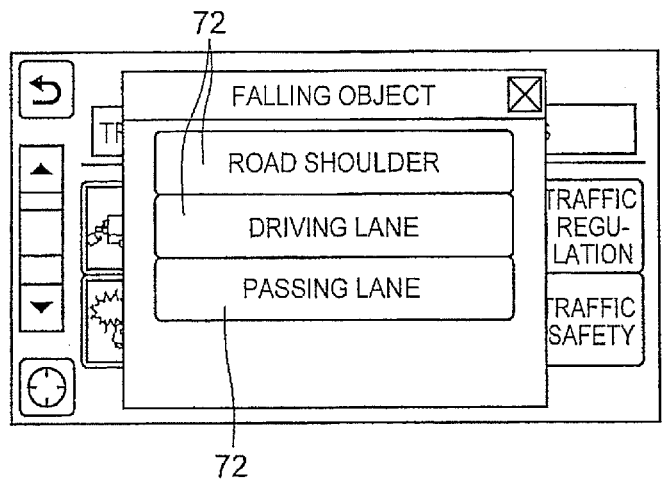
Figure 2C:
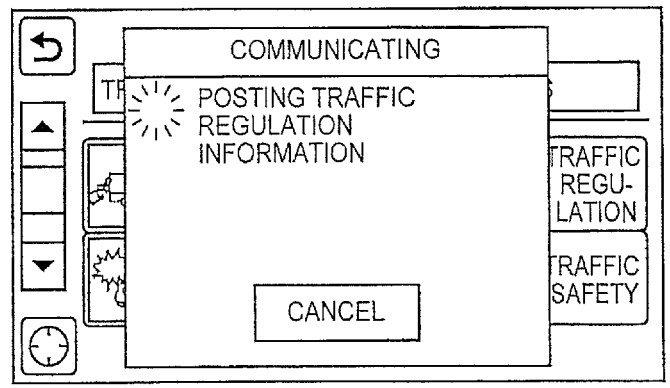

FIGS. 2A-2C are diagrams showing examples of screens displayed on the display device 120. FIG. 2A shows an example of a screen displayed when the user enters an information posting intention into the in-vehicle device 100. FIG. 2B shows an example of a screen displayed before the user enters an information posting instruction into the in-vehicle device 100. FIG. 2C shows an example of a screen displayed after the user enters an information posting instruction into the in-vehicle device 100.

The screen shown in FIG. 2A is displayed when the user enters an information posting intention into the in-vehicle device 100. In the description below, the screen shown in FIG. 2A is called a "posting type selection screen". For example, when the user presses the posting type selection screen call button (not shown), the navigation ECU 110 displays the posting type selection screen on the display device 120. The posting type selection screen call button may be a touch switch on the display device 120 or a mechanical button.

The posting type selection screen includes type buttons 70 used to select a posting information type. For example, the type buttons 70 are each formed by a touch switch. The posting information relates to an event that may affect the traffic. The posting information type indicates a type such as a falling object, congestion, an accident, a disaster, or a traffic regulation.

The screen shown in FIG. 2B is displayed when the user presses one of the type buttons 70. In the description below, the screen shown in FIG. 2B is called a "posting detail selection screen". For example, when the user presses a type button 70, the navigation ECU 110 displays the posting detail selection screen on the display device 120. That is, the screen changes from the posting type selection screen to the posting detail selection screen.

The posting detail selection screen includes posting buttons 72 used to select the detail of a posting information type the user is going to post. For example, the type buttons 72 are each formed by a touch switch. The detail of posting information varies according to the posting information type. The detail of posting information relates to the position, direction, or degree of an event that may affect the traffic. For example, when the posting information type is information on a falling object, the detail of the posting information includes the information on the position of the falling object (whether it is on the road shoulder or in a passing lane, up lane, or down lane). When the posting information type is information on an accident, the detail of the posting information includes the position (whether it is on the road shoulder or in an up lane or down lane) of the accident. When the posting information type is information on congestion, the detail of the posting information includes the direction of a lane where congestion is caused (whether it is in an up lane or down lane) or the degree of congestion.

The screen shown in FIG. 2C is displayed when the user enters an information posting instruction into the in-vehicle device 100. That is, the screen shown in FIG. 2C is a screen that notifies the user that the information posting instruction is accepted. In the description below, the screen shown in FIG. 2C is called a "posting completion notification screen". When the user presses the posting button 72, the navigation ECU 110 displays the posting completion notification screen on the display device 120. That is, the screen changes from the posting detail selection screen to the posting completion notification screen. At this time, when the user presses the posting button 72, the navigation ECU 110 generates posting information corresponding to the pressed posting button 72 and sends the generated posting information to the information processing device 200 via the radio communication device 150. The posting information includes the information indicating the posting information type corresponding to the pressed type button 70 and the information indicating the detail of the posting information corresponding to the pressed posting button 72.

FIG. 3 is a flowchart showing an example of the posting information sending processing performed by the navigation ECU 110. The processing routine shown in FIG. 3 is started when the user presses the posting type selection screen call button.

In step 300, the posting type selection screen, such as the one shown in FIG. 2A, is displayed on the display device 120.

In step 302, the navigation ECU 110 acquires vehicle position information, which indicates the current vehicle position, from the GPS receiver 130. The vehicle position information, acquired from the GPS receiver 130, may be corrected via map matching in the navigation ECU 110. Instead of this, the navigation ECU 110 may use the vehicle position information acquired from the GPS receiver 130 during the processing for implementing the navigation function. In the description below, the vehicle position information acquired for the first time in step 302 is called "first position information". The first position information indicates the position of the in-vehicle device 100 when the user enters a posting intention into the in-vehicle device 100 (hereinafter called a "first position").

In step 304, the navigation ECU 110 determines whether a user's posting instruction is received. In this example, the navigation ECU 110 determines whether the posting button 72 is pressed. If the posting button 72 is pressed, the processing proceeds to step 306. On the other hand, if the posting button 72 is not pressed, the processing is repeated beginning in step 302 after a predetermined time (for example, after one second). The vehicle position information, acquired in step 302 for the second and subsequent times, is called "intermediate position information". During this time, the screen shown in FIG. 2A or FIG. 2B remains displayed. If no input is received for a predetermined time (for example, one minute) from the time the posting type selection screen is displayed, a timeout may be caused to terminate the processing routine shown in FIG. 3. In this case, the screen shown in FIG. 2A or FIG. 2B may be returned to the one displayed before the posting type selection screen call button is pressed or may be continued to be displayed.

In step 306, the vehicle position information indicting the vehicle's current position is acquired from the GPS receiver 130. In the description below, the vehicle position information acquired in step 306 is called "second position information". The second position information indicates the position of the in-vehicle device 100 when the user enters a posting instruction into the in-vehicle device 100.

In step 308, the posting information, as well as the first position information and the second position information, is sent to the information processing device 200. That is, the posting information, associated with the first position information and the second position information, is sent. In addition to the first position information and the second position information, the intermediate position information may also be sent to the information processing device 200. The information indicating the time at which the first position information is acquired (hereinafter called "first point-in-time information"), the information indicating the time at which the second position information is acquired (hereinafter called "second point-in-time information"), and/or the information indicating the time at which the intermediate position information is acquired (hereinafter called "intermediate point-in-time information") may also be sent to the information processing device 200. In the description below, the first point-in-time information, second point-in-time information, and intermediate point-in-time information are sometimes called simply "point-in-time information". The information indicating the vehicle direction at the first position and/or the information indicating the vehicle direction at the second position may also be sent to the information processing device 200. The vehicle direction may be detected by a geomagnetic sensor.

According to the processing shown in FIG. 3, the first position information, which indicates the time an information posting intention is entered, and the second position information, which indicates a time an information posting instruction is entered, in conjunction with the posting information, can be sent to the information processing device 200. Sending the information described above allows the information processing device 200 to increase the accuracy of the position information associated with the posting information (this will be described later).

FIG. 4 is a flowchart showing an example of the posting information storing processing performed by an information processing device 200. The processing routine shown in FIG. 4 is started when posting information is received from the in-vehicle device 100.

In step 400, the distance between the first position and the second position is calculated based on the first position information and the second position information that are received.

In step 402, the information processing device 200 determines whether the distance, calculated in step 400 above, is equal to or larger than a predetermined distance X [m]. If the distance is equal to or larger than the predetermined distance X, the processing proceeds to step 404; otherwise, the processing proceeds to step 406.

In step 404, the second position is selected.

In step 406, the first position is selected.

In step 408, the information indicating the position selected in step 404 or step 406 (second position information or first position information) is associated with the received posting information and is stored in the posting database 220. The first point-in-time information and the second point-in-time information, if received with the first position information and the second position information described above, may be associated with the received posting information and stored in the posting database 220. That is, if the second position information is selected, the second position information and the second point-in-time information may be associated with the posting information and stored in the posting database 220. Similarly, if the first position information is selected, the first position information and the first point-in-time information may be associated with the posting information and stored in the posting database 220.

According to the processing shown in FIG. 4, the second position information or the first position information can be associated with the posting information and stored in the posting database 220. At this time, the position information, either first position information or second position information, to be associated with the posting information is selected according to the distance between the first position and the second position. That is, if the distance between the first position and the second position is equal to or larger than the predetermined distance X, the second position information is selected. On the other hand, if the distance is smaller than the predetermined distance X, the first position is selected.

Note that, when entering posting information during traveling, the vehicle travels some distance from the time a posting intention is entered to the time a posting instruction is entered, with the result that there is a deviation in the vehicle position between the two points in time. Concerning this point, our test shows which of the two positions, first position or second position, is nearer to the event indicated by the posting information can be determined more accurately by considering the distance between the first position and the second position. For example, even when the user finds an event sufficiently far from the event position (spot of the event) and enters a posting intention, the user tends to actually enter a posting instruction at a position past the event position in many cases. On the other hand, when the user enters a posting intention near the event position (spot of the event), the user tends to enter a posting instruction immediately after entering the posting intention in many cases.

Therefore, according to the processing shown in FIG. 4, one of the two pieces of position information, either first position information or second position information, that indicates a position potentially nearer to an event indicated by the posting information can be associated with the posting information and stored in the posting database 220.

The predetermined distance X, a threshold for determining the two tendencies (patterns) described above, is determined by a test. That is, the predetermined distance X, which is a threshold for determining which position, either first position or second position, is nearer to an event (for example, a falling object) indicated by the posting information, is determined by a test. The predetermined distance X may be varied according to the vehicle speed in such a way that the higher the vehicle speed is, the larger the distance is. In this case, the vehicle speed may be calculated based on the history of the position information (first position information, second position information, and/or intermediate position information) and the point-in-time information.

Figure 5:
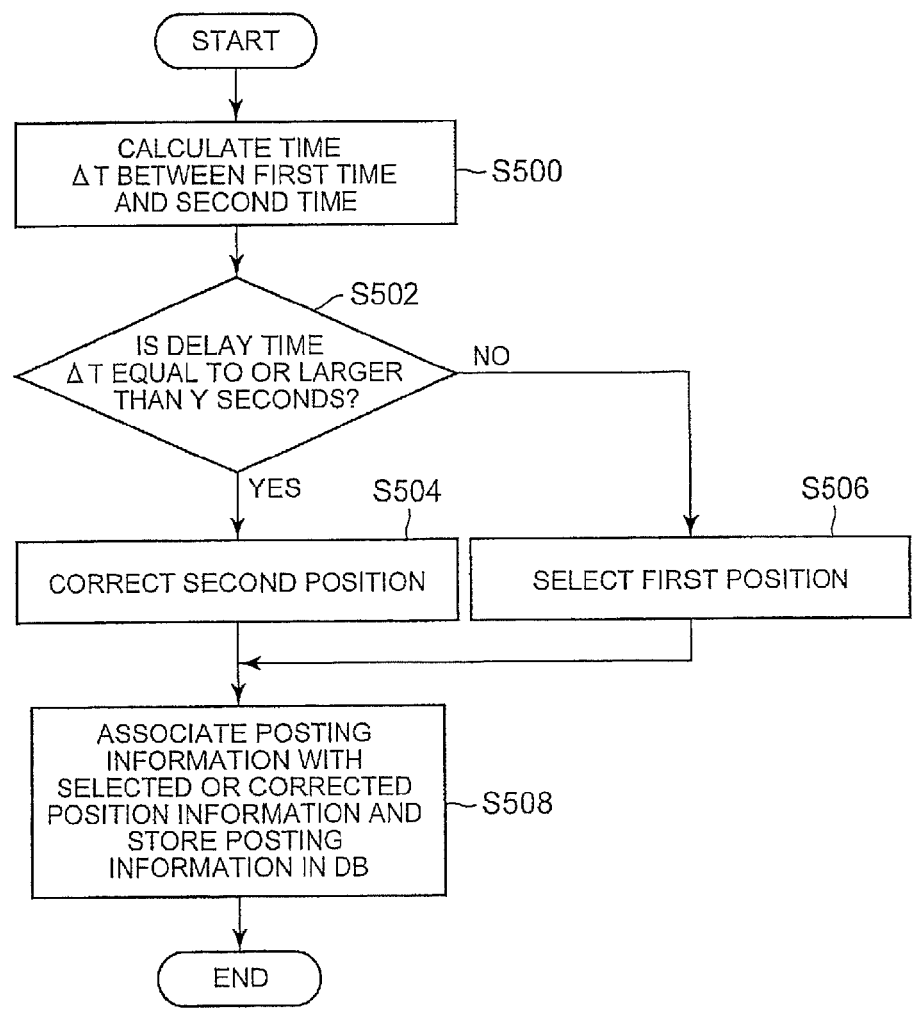
FIG. 5 is a flowchart showing another example of the posting information storing processing performed by the information processing device 200 in the embodiment of the present invention.

FIG. 5 is a flowchart showing another example of the posting information storing processing performed by the information processing device 200. The processing routine shown in FIG. 5 is started when posting information is received from the in-vehicle device 100. The processing shown in FIG. 5 assumes that the information received from the in-vehicle device 100 includes the posting information, the first position information and the second position information, and the first point-in-time information and the second point-in-time information.

In step 500, the time $\Delta T$ between the first point-in-time and the second point-in-time (hereinafter called "delay time $\Delta T$") is calculated based on the received first point-in-time information and the second point-in-time information.

In step 502, the information processing device 200 determines whether the delay time $\Delta T$, calculated in step 500 above, is equal to or longer than a predetermined time Y [sec]. If the delay time $\Delta T$ is equal to or longer than the predetermined time Y, the processing proceeds to step 504; otherwise, the processing proceeds to step 506.

In step 504, the second position is selected and corrected. The correction is performed in such a way that the second position after the correction becomes a position between the first position and the second position before the correction. Any correction method may be used for correcting the second position. For example, the second position may be simply corrected to an intermediate position between the first position and the second position. The second position may also be corrected using the Bayesian inference given below.

$$P(H_2 | D) = \frac{P(H_2) \cdot P(D \cdot H_2)}{P(H_2) \cdot P(D | H_2) + P(H_1) \cdot P(D | H_1)}$$

where, H1 indicates an event that the first position is selected, and H2 indicates an event that the second position is selected. P(H1) and P(H2) are each 50%. D indicates a result that the selected position is near to the event indicated by the posting information. P(D/H1) indicates the probability that the first position is near to the position of the event indicated by the posting information when the delay time $\Delta T$ is the predetermined time Y and that the second position is near to the position of the event indicated by the posting information when the delay time $\Delta T$ is the predetermined time Y. P(H1) and P(H2) may be derived in advance by a test. At this time, the second position may be corrected to the first position side by P(H2/D)×(distance between first position and second position).

In step 506, the first position is selected.

In step 508, the information indicating the position (corrected second position information or first position information), selected in step 504 or step 506 described above, is associated with the received posting information and stored in the posting database 220. That is, if the second position information is selected and corrected, the corrected second position information and the second point-in-time information are associated with the posting information and stored in the posting database 220. Similarly, if the first position information is selected, the first position information and the first point-in-time information are associated with the posting information and stored in the posting database 220.

According to the processing shown in FIG. 5, the corrected second position information or the first position information can be associated with the posting information and stored in the posting database 220. At this time, the position information, either first position information or second position information, to be associated with the posting information is selected according to the delay time $\Delta T$ between the first time and the second time. That is, if the delay time $\Delta T$ between the first time and the second time is equal to or larger than the predetermined time Y, the second position information is selected and corrected. On the other hand, if the time is smaller than the predetermined time Y, the first position is selected.

Note that, when entering posting information during traveling, the time elapses from the time a posting intention is entered to the time a posting instruction is entered, with the result that there is a deviation in the vehicle position between the two points in time. Concerning this point, our test shows which of the two positions, first position or second position, is nearer to the event indicated by the posting information can be determined more accurately by considering the delay time $\Delta T$ between the first time and the second time. For example, even when the user finds an event sufficiently far from the event position (spot of the event) and enters a posting intention, the user tends to actually enter a posting instruction at a position past the event position in many cases. On the other hand, when the user enters a posting intention near the event position (spot of the event), the user tends to enter a posting instruction immediately after entering the posting intention in many cases.

Therefore, according to the processing shown in FIG. 5, one of the two pieces of position information, either first position information or second position information, that indicates a position potentially nearer to an event, indicated by the posting information, can be associated with the posting information and stored in the posting database 220.

The predetermined time Y, a threshold for determining the two tendencies (patterns) described above, is determined by a test. That is, the predetermined time Y, which is a threshold for determining which position, either first position or second position, is nearer to an event (for example, a falling object) indicated by the posting information, is determined by a test. The predetermined time Y may be varied in such a way that the higher the vehicle speed is, the shorter the time is.

In addition, according to the processing shown in FIG. 5, the second position information, which is corrected and then associated with the posting information, increases the possibility that the position indicated by the second position information becomes nearer to the event position. That is, though the position indicated by the second position information is not always guaranteed that it is near to the event position, the correction processing, in which the stochastic and statistical factors are taken into consideration, can increase the possibility that the position indicated by the second position information is near to the event position.

Although the second position is corrected when selected in the processing shown in FIG. 5, the correction of the second position may be omitted as in the processing shown in FIG. 4. Conversely, the second position may be corrected when selected in the processing shown in FIG. 4 as in the processing shown in FIG. 5.

The processing shown in FIG. 5 may be combined with the processing shown in FIG. 4. For example, one of the first position and the second position may be selected by considering both the delay time ΔT and the distance between the first position and the second position, or the correction described above may be performed when the second position is selected. For example, it is possible that the processing of step 404 or step 504 is performed if the distance between the first position and the second position is equal to or larger than the predetermined distance X and if the delay time ΔT is equal to or larger than the predetermined time Y and, in other cases, the processing of step 406 is performed. It is also possible that the processing is switched according to the following two conditions: one condition is that the distance between the first position and the second position is equal to or larger than the predetermined distance X and the other condition is that the delay time ΔT is equal to or larger than the predetermined time Y. If the two conditions are satisfied, the processing of step 404 is performed. If none of the two conditions is satisfied, the processing of step 406 is performed. If one of the two conditions is satisfied, the processing of step 504 is performed.

The processing shown in FIGS. 4 and 5 is performed by the information processing device 200, but the invention is not limited thereto. After the processing is performed by the in-vehicle device 100, the posting information including one of the position information may be sent to the information processing device 200 and stored in the posting database 220. In this case, the posting information including first position information and second position information is deleted one of the position information from, and then the other position information is sent to the information processing device 200.

Figure 6:
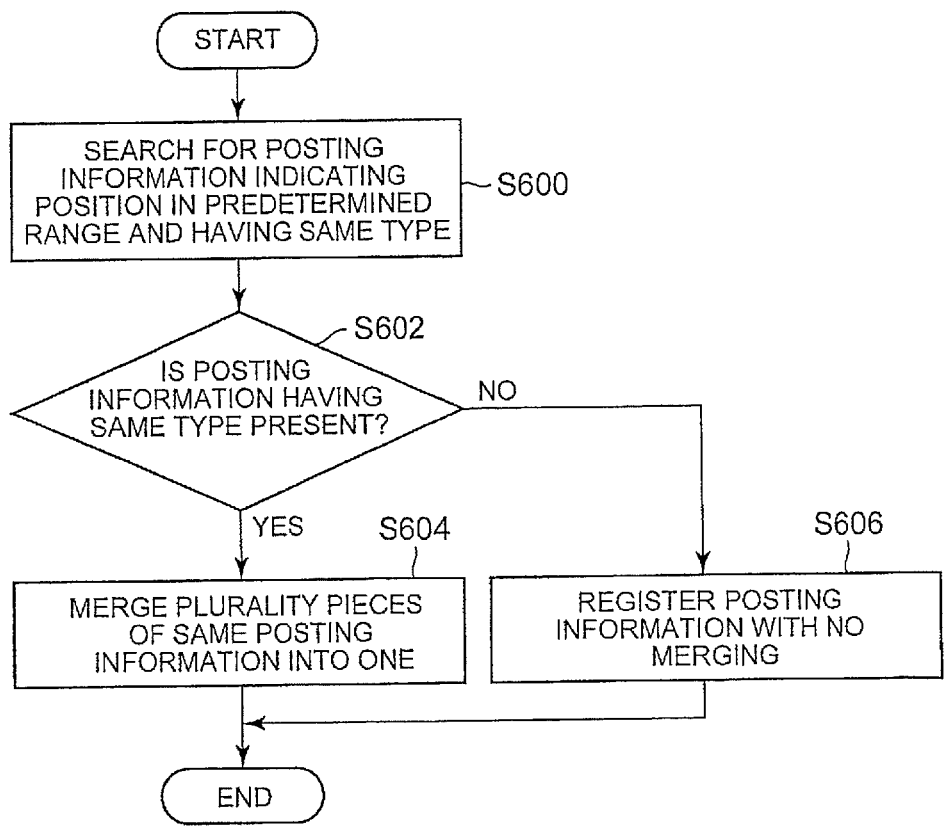
FIG. 6 is a flowchart showing an example of the posting information merge processing performed by the information processing device 200 in the embodiment of the present invention.

FIG. 6 is a flowchart showing an example of the posting information merge processing performed by the information processing device 200. The processing routine shown in FIG. 6 may be performed at a periodic interval or at a time when new posting information is stored in the posting database 220. It is assumed that the processing routine shown in FIG. 6 is performed when the processing of step 408 in FIG. 4 is performed or when the processing of step 508 in FIG. 5 is performed.

In step 600, the information processing device 200 searches the posting database 220 for posting information that indicates a position within a predetermined distance range and has the same type as that of the posting information to be stored. That is, the information processing device 200 searches for another piece of posting information that satisfies that (1) its associated position information indicates a position within a predetermined range of distance from the position indicated by the position information associated with the posting information to be stored and (2) its type is the same as that of the posting information to be stored. Posting information includes the information indicating its type as described above. The predetermined range of distance may be a range within a radius of a predetermined distance Z [m] with the center being the position indicated by the position information associated with the posting information to be stored. The predetermined distance Z is set considering a range of variations in the position information associated with each of a plurality of pieces of posting information posted on the same event by a plurality of users. If the posting database 220 includes another piece of posting information that indicates a position within a predetermined range of distance from the position indicated by the posting information to be stored and that has the same type as that of the posting information to be posted (YES in step 602), the processing proceeds to step 604. If there is no such posting information, the processing proceeds to step 606.

In step 604, a plurality of pieces of posting information each indicating a position in the predetermined distance range and having the same type are merged. That is, a plurality of pieces of posting information each indicating a position in the predetermined distance range and having the same type are combined into one piece of posting information.

In step 606, the posting information to be stored is registered without being merged with another piece of posting information.

According to the processing shown in FIG. 6, a plurality of pieces of posting information each indicating a position in the predetermined distance range and having the same type are merged. Thus, a plurality of pieces of posting information about the same event, if provided by a plurality of users, can be merged into one piece of posting information.

Although a plurality of pieces of posting information each indicating a position in a predetermined distance range and having the same type are merged in the processing shown in FIG. 6, other attributes may also be considered. For example, a plurality of pieces of posting information may be merged if their positions indicate a position in a predetermined distance range, if they have the same type, and if their details are the same. As described above, posting information includes information indicating the detail of posting information corresponding to the posting button 72 that is pressed. Using the detail of posting information for the merge processing reduces the possibility of merging posting information with different details, for example, the possibility of merging between posting information on the up lane and the posting information on the down lane.

Figure 7:
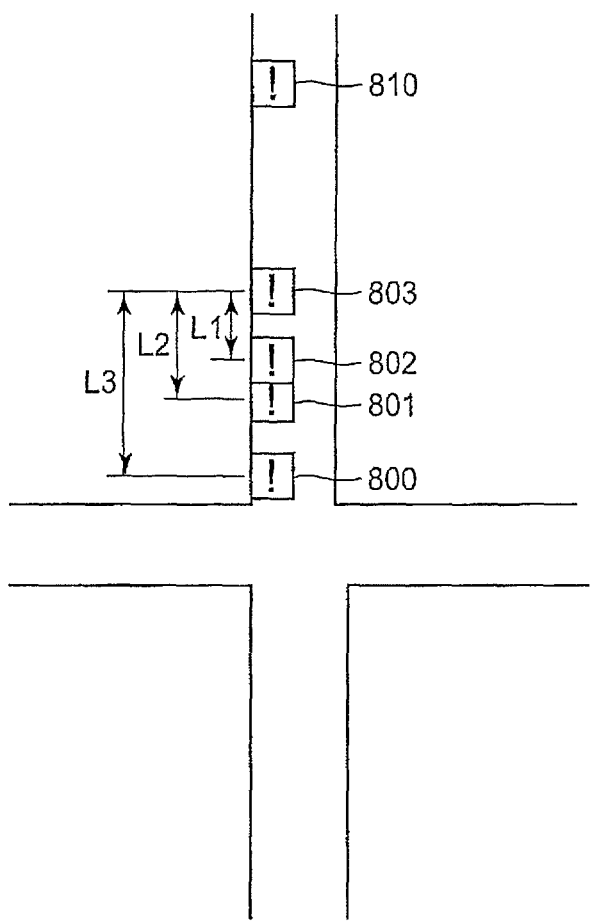
FIG. 7 is a diagram showing an example of a merge method in the embodiment of the present invention.

FIG. 7 is a diagram showing an example of a merge method. The illustration in FIG. 7 represents the positions of posting information, stored in the posting database 220, as icons 800 to 803 and an icon 810 on the road. The icons 800 to 803 indicate posting information before being merged.

In the example shown in FIG. 7, the plurality of pieces of posting information corresponding to icons 800 to 803 is merged because they indicate positions in a predetermined distance range, have the same type, and have the same detail. On the other hand, the icon 810 is not merged because it is not in the predetermined distance range. The position information to be associated with the merged posting information, corresponding to the icons 800 to 803, may represent the average position of the plurality of pieces of positions information corresponding to icons 800 to 803. For example, the distances L1, L2, and L3 from the position of the farthest icon 803 (the reference position) to the icons 800, 801, and 802 are calculated and, then, the average distance (=(L1+L2+L3)/3) is calculated. After that, the position information, which represents the position calculated by adding the average distance to the position of the nearest icon 800, may be associated with the merged posting information.

Figure 8:
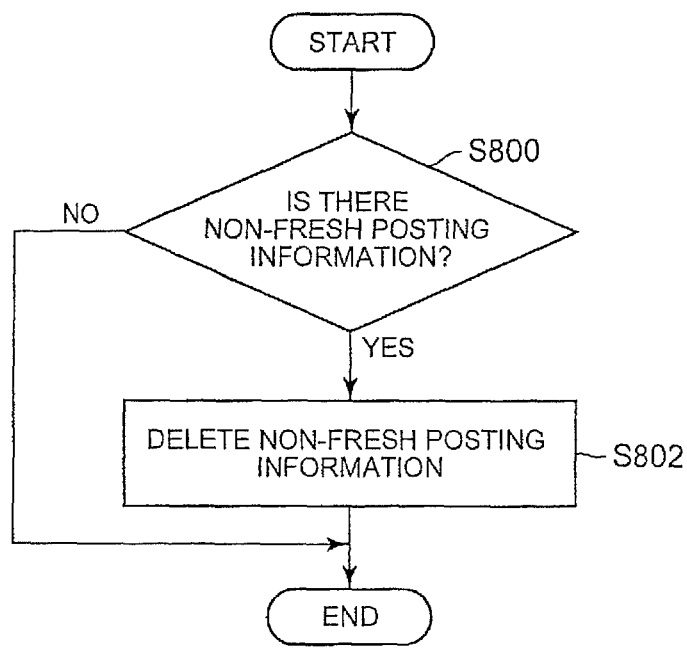
FIG. 8 is a flowchart showing an example of the posting information deletion processing performed by the information processing device 200 in the embodiment of the present invention.

FIG. 8 is a flowchart showing an example of the posting information deletion processing performed by the information processing device 200. The processing routine shown in FIG. 8 may be performed at a periodic interval (for example, every predetermined number of minutes).

In step 800, the information processing device 200 determines whether there is non-fresh posting information in the posting database 220. Non-fresh posting information may refer to posting information that has elapsed a predetermined time or longer from the time the information is stored (or from the time the information is merged last if it is merged) or from the time indicated by the associated point-in-time information. If there is non-fresh posting information, the processing proceeds to step 802. In other cases, the processing is terminated immediately.

In step 802, the non-fresh posting information is deleted from the posting database 220.

According to the processing shown in FIG. 8, non-fresh posting information can be deleted from the posting database 220. Deleting non-fresh posting information from the posting database 220 allows only fresh (and therefore reliable) posting information to be maintained in the posting database 220. The freshness of posting information is important because the posting information relates to an event that may affect the traffic as described above. Such an event tends to vary over time. For example, a falling object, once removed, is not present on the road. The threshold (predetermined time) used in step 800 may be changed according to the type of posting information. This is because the time for generating a meaningful change depends on the event.

Figure 9:
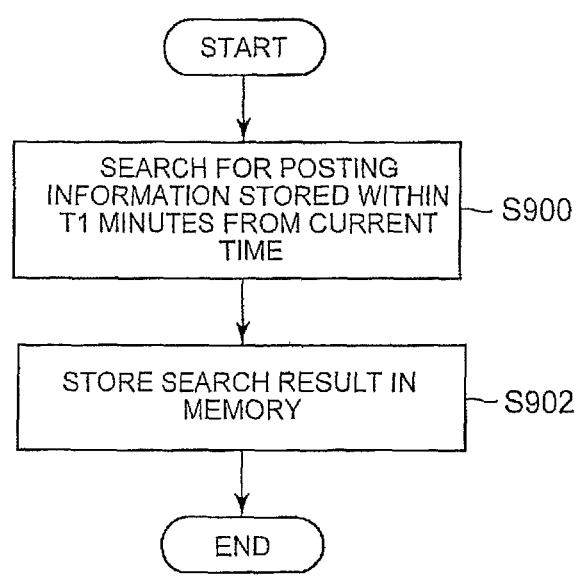
FIG. 9 is a flowchart showing an example of the posting information update processing performed by the information processing device 200 in the embodiment of the present invention.

FIG. 9 is a flowchart showing an example of the posting information update processing performed by the information processing device 200. The processing shown in FIG. 9 may be performed at a periodic interval (for example, every predetermined number of minutes).

In step 900, the information processing device 200 searches the posting database 220 for posting information stored within a predetermined time (T1 [minutes] in this example) from the current time. That is, the information processing device 200 searches the posting database 220 for posting information stored within a predetermined time T1 from the time the information is stored (or from the time the information is merged last if it is merged) or from the time indicated by the associated point-in-time information.

In step 902, the posting information that has been searched for, as well as its associated position information, is stored in the memory (not shown).

According to the processing shown in FIG. 9, fresh (and therefore reliable) posting information can be stored in the memory. Storing fresh posting information in the memory allows posting information to be sent quickly from the memory when a posting information acquisition request is received from the in-vehicle device 100 (see FIG. 10), increasing responsiveness to a posting information acquisition request.

Figure 10:
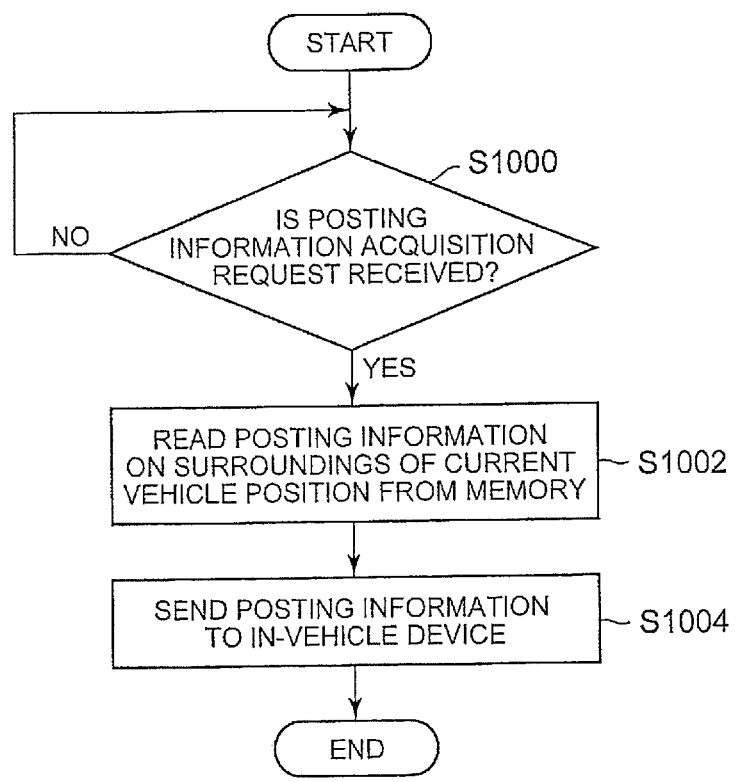
FIG. 10 is a flowchart showing an example of the posting information sending processing performed by the information processing device 200 in the embodiment of the present invention.

FIG. 10 is a flowchart showing an example of the posting information sending processing performed by the information processing device 200. The processing routine shown in FIG. 10 may be performed at a predetermined processing periodic interval (for example, every predetermined number of seconds or at a shorter periodic interval).

In the processing shown in FIG. 10, it is assumed that the in-vehicle device 100 sends a posting information acquisition request to the information processing device 200. The posting information acquisition request is sent with the information indicating the current vehicle position. The in-vehicle device 100 may send a posting information acquisition request to the information processing device 200 at a periodic interval or in response to a request from the user.

In step 1000, the information processing device 200 determines whether a posting information acquisition request is received from the in-vehicle device 100. If a posting information acquisition request is received from the in-vehicle device 100, the processing proceeds to step 1002. In other cases, the processing returns to step 1000 (to wait for a posting information acquisition request to be received).

In step 1002, the information processing device 200 reads posting information on the surroundings of the current vehicle position (position of the vehicle on which the in-vehicle device 100, which has sent the posting information acquisition request, is mounted) and its associated position information from the memory (see step 902 in FIG. 9). The surroundings of the current vehicle position may be an area within a range that is a predetermined distance Z1 away from the current vehicle position. The predetermined distance Z1 may be a distance in all directions of the current vehicle position or may be a distance in the traveling direction of the vehicle (along the traveling road).

In step 1004, the posting information read in step 1002 above is sent to the in-vehicle device 100. At this time, the posting information is sent with its associated position information. The posting information may also be sent with its associated point-in-time information. The posting information may also be sent with its associated display time limit information. The display time limit information, which is an example of information indicating the freshness of posting information, represents a period during which the information can be displayed. For example, the display time limit information may be information such as "until what minute of what hour of today is the display effective" or "how long in minutes from now is the display effective". The display time limit information may be generated by considering the current elapsed time, which is measured from the time the information is stored (or from the time the information is merged last if it is merged) or from the point in time indicated by the associated point-in-time information, or by considering the posting information type.

According to the processing shown in FIG. 10, when a posting information acquisition request is received from the in-vehicle device 100, the information processing device 200 can send the posting information and its associated position information to the in-vehicle device 100. This allows the in-vehicle device 100 to perform suitable travel support based on the posting information and its associated position information (see FIG. 11).

In the processing shown in FIG. 10, the posting information and its associated position information, though sent to the in-vehicle device 100 in response to a posting information acquisition request from the in-vehicle device 100, may also be sent to the in-vehicle device 100 in the so-called push mode. In this case, the posting information and its associated position information may be regularly broadcast to the in-vehicle devices 100 of the vehicles located in the related area.

Figure 11:
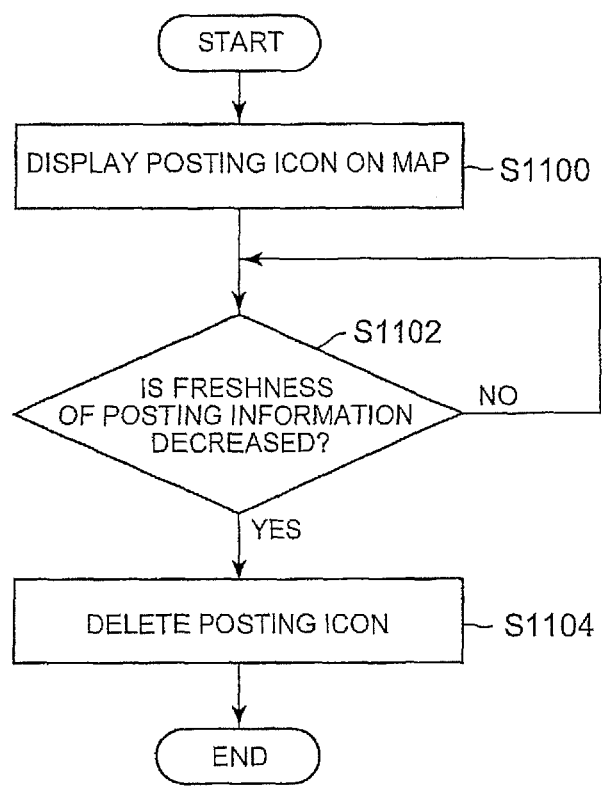
FIG. 11 is a flowchart showing an example of the posting icon display processing performed by a navigation ECU 110 of an in-vehicle device 100 in the embodiment of the present invention.
Figure 12:
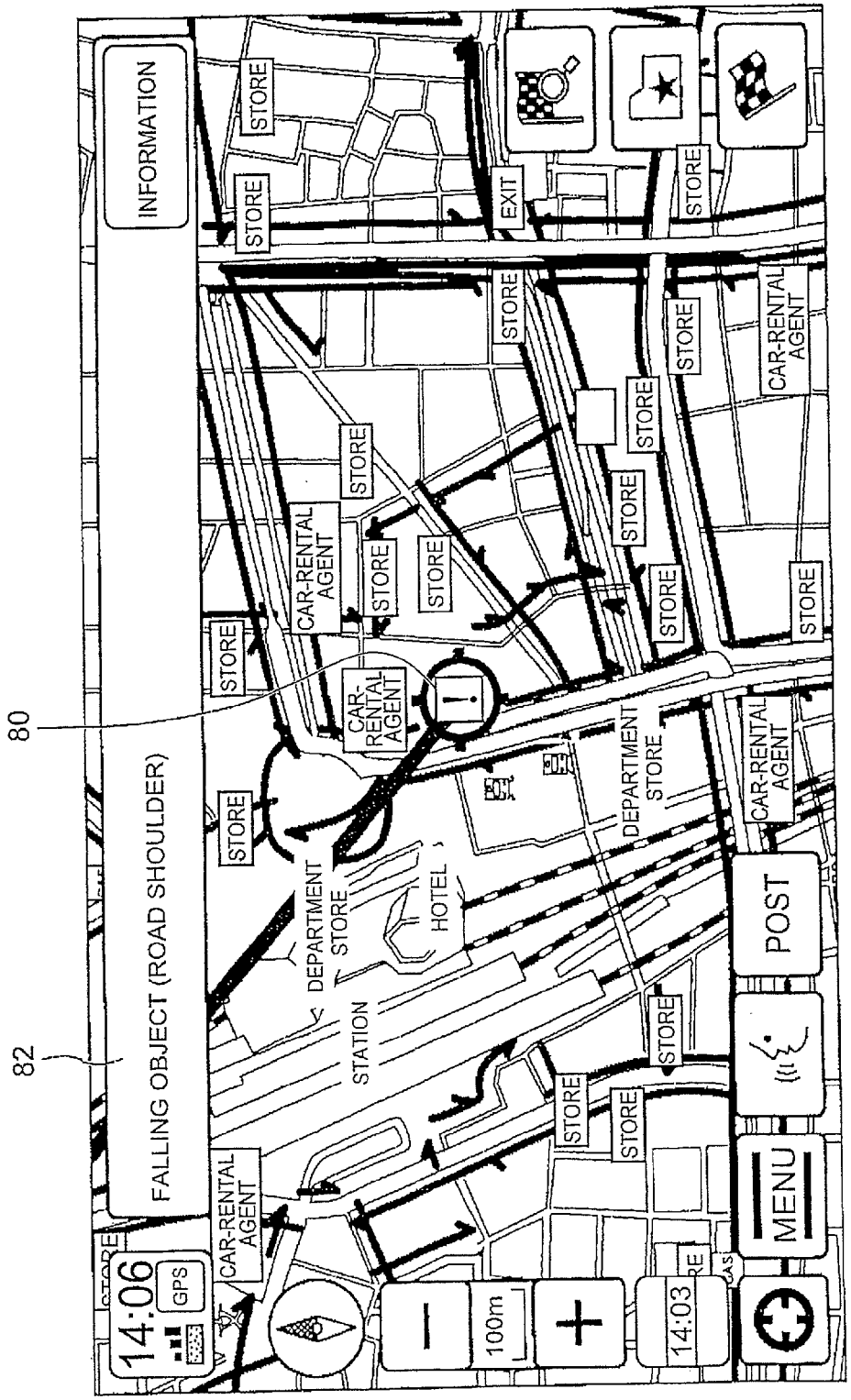
FIG. 12 is a diagram showing an example of the display of a map on which a posting icon 80 is superimposed in the embodiment of the present invention.

FIG. 11 is a flowchart showing an example of the posting icon display processing performed by the navigation ECU 110 of the in-vehicle device 100. The processing shown in FIG. 11 may be started when posting information and its associated position information are acquired from the information processing device 200 via the radio communication device 150. FIG. 12 is a diagram showing an example of the display of a map on which a posting icon 80 is superimposed. This map is displayed on the display device 120.

In the processing shown in FIG. 11, it is assumed that posting information and its associated display time limit information are sent from the information processing device 200 to the in-vehicle device 100.

In step 1100, the posting icon 80 (see FIG. 12) is superimposed on the map display based on the acquired posting information and its associated position information. The posting icon 80 may be an icon display that alerts the driver as shown in FIG. 12. The posting icon 80 may be a display that differs according to the posting information type. The superimposition display position on the map display is determined based on the position information associated with the posting information. The superimposition display position, which typically coincides with the position indicated by the position information associated with the posting information, may be corrected via map matching. This allows the driver to know that posting information on the surroundings of the vehicle is posted and to confirm the position of an event, related to the posting information, on the map display. The posting icon 80 may include information indicating the type and the detail of the posting information. For example, the type and the detail of the posting information may be output in the form of a text display 82 that is superimposed on the map display. It is also possible to display the type and the detail of the posting information when the user touches the posting icon 80.

In step 1102, based on the acquired display time limit information, the navigation ECU 110 determines whether the freshness of posting information is decreased. More specifically, the navigation ECU 110 determines whether the display time limit, indicated by the acquired display time limit information, has passed. If the freshness of posting information is decreased, the processing proceeds to step 1104. On the other hand, the processing returns to step 1102 in other cases and, after a predetermined time elapses, the navigation ECU 110 performs the determination in step 1102 again. During this period, if the posting icon 80 goes out of the screen as the vehicle travels, the processing in FIG. 11 may be terminated immediately.

In step 1104, the display of the posting icon 80 is deleted. The posting icon 80 disappears from the map display. In this way, the posting icon 80 related to posting information, which has become non-fresh, can be erased from the map display.

According to the processing shown in FIG. 11, posting information acquired from the information processing device 200 can be displayed at a position (a position on the map display) determined based on the position information associated with the posting information. The position information associated with the posting information is likely to indicate a position near to an event indicated by the posting information. Therefore, the superimposition display position of the posting icon 80 becomes more reliable.

Figure 13:
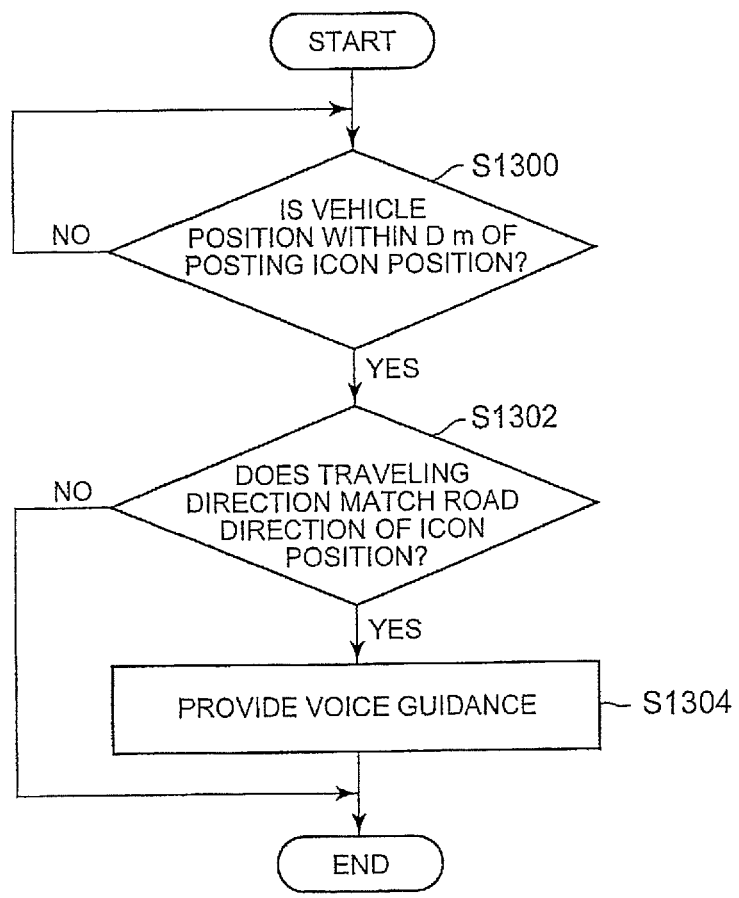
FIG. 13 is a flowchart showing an example of the posting-information-related alert processing performed by the navigation ECU 110 of the in-vehicle device 100 in the embodiment of the present invention.

FIG. 13 is a flowchart showing an example of the posting-information-related alert processing performed by the navigation ECU 110 of the in-vehicle device 100. The processing shown in FIG. 13 may be started when the vehicle position approaches the position of the posting icon 80 on the map display.

In step 1300, the navigation ECU 110 determines whether the vehicle position is within a predetermined distance D [m] to the position of the posting icon 80. If the vehicle position is within the predetermined distance D to the position of the posting icon 80, the processing proceeds to step 1302. In other cases, the navigation ECU 110 enters the wait state. The predetermined distance D, which corresponds to a distance at which an alert to the position of an event is required, may be varied according to the type of the posting information, related to the posting icon 80, or to the vehicle speed.

In step 1302, the navigation ECU 110 determines whether the traveling direction of the vehicle matches the road direction of the posting icon 80. The road direction of the posting icon 80 is either an up lane or a down lane. The navigation ECU 110 determines the road direction of the posting icon 80 based on the information indicating the detail of the posting information related to the posting icon 80. If the traveling direction of the vehicle matches the road direction of the posting icon 80, the processing proceeds to step 1304. In other cases, the processing for the current posting icon 80 is terminated immediately (therefore, an alert to the current posting icon 80 is not executed).

In step 1304, an alert to the current posting icon 80 is executed (voice guidance in this example).

According to the processing shown in FIG. 13, an alert can be issued to the driver when the vehicle position approaches the position of the posting icon 80 with the posting icon 80 superimposed on the map display.

Figure 14:
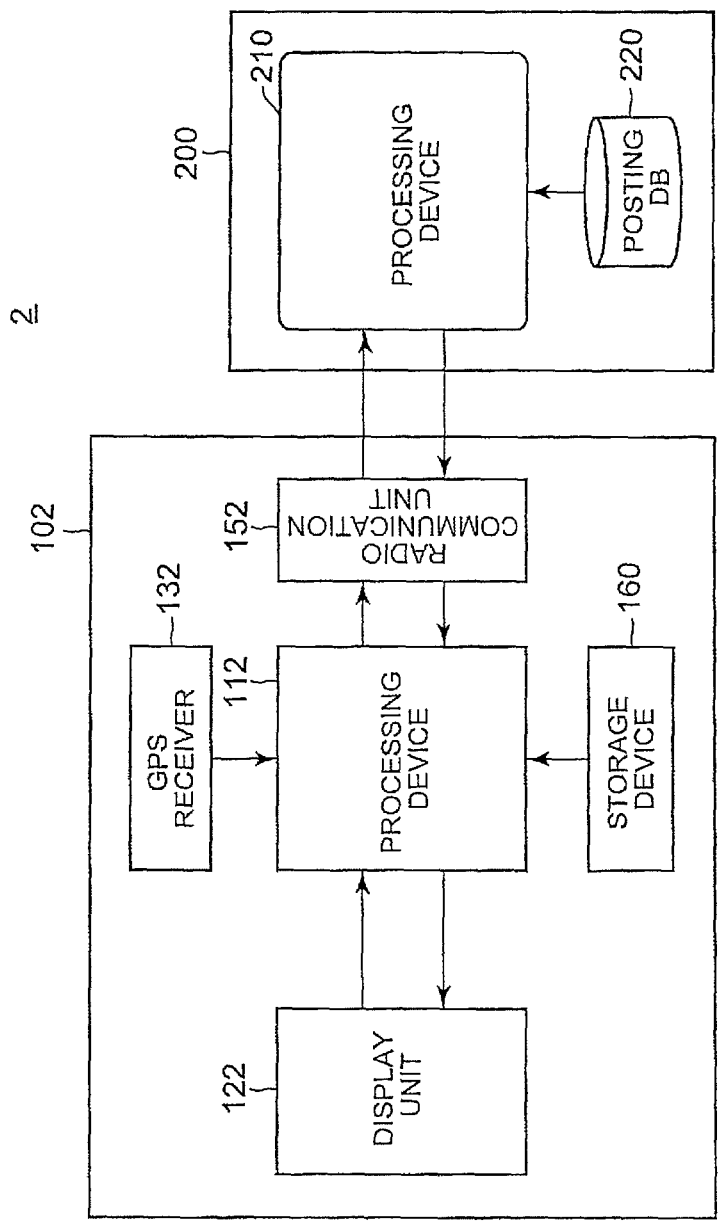
FIG. 14 is a diagram showing an overall configuration of a system 2 in the embodiment of the present invention.

FIG. 14 is a diagram showing an overall configuration of a system 2. The system 2 includes a mobile terminal (an example of portable terminal) 102 and an information processing device 200.

The mobile terminal 102 may be a mobile phone, a smartphone, or a tablet terminal. The mobile terminal 102 includes a processing device 112, a display unit 122, a GPS receiver 132, and a radio communication unit 152. The functions of the display unit 122, GPS receiver 132, and radio communication unit 152 may be the same as those of the display device 120, UPS receiver 130, and radio communication device 150, shown in FIG. 1, respectively.

The processing device 112, which works as a terminal processing device, implements the function, similar to that of the navigation ECU 110 described above, by performing an application read from a storage device 160. The application may be stored in the storage device 160 in advance, may be downloaded from an external device for recording it in the storage device 160, or may be recorded in the storage device 160 via a recording medium.

While the embodiments have been described above in detail, it is to be understood that the present invention is not limited to the specific embodiments and that various modifications and changes may be made within the scope of claims. It is also possible to combine all or some of the components used in the embodiments described above.

For example, though posting information can be sent to the information processing device 200 by a minimum of three steps of operations in the embodiment described above, any other mode may also be used if posting information can be sent to the information processing device 200 by two or more steps of operations.

A user's information posting intention is detected in the embodiment above when the posting type selection screen call button is pressed by the user. The posting intention may also be detected when the type button 70 is pressed or at any time between the time the former button is pressed and the time the latter button is pressed.

Although posting information includes information about the road direction and the information about the road direction indicates whether the lane is an up lane or a down lane in the above embodiment, the information about the road direction may be information indicating whether the lane is a driving lane or an oncoming lane. In this case, the information processing device 200 may calculate the traveling direction of a vehicle, which has sent posting information, based on the first position information, second position information, and intermediate position information and, based on the calculated traveling direction, generate information indicating whether the lane is an up lane or a down lane.

What is claimed is:
1. An information processing device that receives and processes posting information, and associated global position information, from a mobile terminal comprising a global positioning system (GPS) receiver, the information processing device comprising:
a center processing device; and
a memory configured to store information processed by the center processing device in a posting database, wherein
the center processing device is configured to:
receive posting information for a posting and associated first global position information and second global position information for the posting, the first global position information indicating a first global position of the mobile terminal when a user enters an information posting intention into the mobile terminal, the information posting intention being information indicating that a user has selected an instruction selection call screen or a type of instruction, and the second global position information indicating a second global position of the mobile terminal when the user enters an information posting instruction into the mobile terminal; and
determine global position information to be associated with the received posting information, based on at least one of a global position difference between the first global position and the second global position and a temporal difference between a first point-in-time at which the mobile terminal is positioned at the first global position and a second point-in-time at which the mobile terminal is positioned at the second global position; and
store the determined global position information in the posting database of the memory.

2. The information processing device according to claim 1 wherein when the global position difference or the temporal difference is equal to or larger than a predetermined threshold, the center processing device associates the second global position information with the posting information.

3. The information processing device according to claim 1 wherein when the global position difference or the temporal difference is smaller than a predetermined threshold, the center processing device associates the first global position information with the posting information.

4. The information processing device according to claim 1 wherein when the global position difference or the temporal difference is smaller than a predetermined threshold, the center processing device calculates a third global position that is between the first global position and the second global position based on the first global position and the global second position and associates the determined global position information, which indicates the calculated global position, with the posting information.

5. The information processing device according to claim 1 wherein the center processing device sends the posting information and the determined global position information, associated with the posting information, to an in-vehicle device.

6. The information processing device according to claim 1 wherein the posting information relates to an event that affects traffic.

7. The information processing device according to claim 1 wherein when posting information about the same event is received from a plurality of the mobile terminals, the center processing device merges a plurality of pieces of the posting information about the same event into one piece of posting information.

8. A mobile terminal for posting information to an information processing device, the mobile terminal comprising:
a terminal processing device; and
a global positioning system (GPS) receiver, wherein the terminal processing device is configured to:
generate posting information for a posting including associated first global position information and second global position information, the first global position information indicating a first global position of the mobile terminal when a user enters an information posting intention for the posting into the mobile terminal, the information posting intention being information indicating that the user has selected an instruction selection call screen or a type of instruction, and the second global position information indicating a second global position of the mobile terminal when the user enters an information posting instruction for the posting into the mobile terminal; and
transmit, to the information processing device, the posting information for the posting including the detected first global position and the detected second global position.

9. The mobile terminal of claim 8, wherein the terminal processing device is further configured to:
receive posting information from the information processing device; and
control a display device to output the posting information received from the information processing device.

10. A non-transitory recording medium recording therein a program executable on a mobile terminal having a global positioning system (GPS) receiver, wherein the program, when executed by a processor, comprises the steps of:
acquiring, by the processor, first global position information from the GPS receiver, the first global position information indicating a first global position of the mobile terminal when an entry of a user's information posting intention for a posting is detected, the user's information posting intention being information indicating that the user has selected an instruction selection call screen or a type of instruction;
acquiring, by the processor, second global position information from the GPS receiver, the second global position information indicating a second global position of the mobile terminal when an entry of a user's information posting instruction for the posting is detected, and
transmitting, by the processor, the acquired first global position information, the acquired second global position information, and posting information for the posting, to an external information processing device.

* * * * *